(12) United States Patent
Cantolino

(10) Patent No.: US 11,830,691 B1
(45) Date of Patent: Nov. 28, 2023

(54) LATCHING MAGNETIC FLOAT SWITCH

(71) Applicant: DiversiTech Corporation, Duluth, GA (US)

(72) Inventor: Christopher Cantolino, Bradenton, FL (US)

(73) Assignee: DiversiTech Corporation, Duluth, GA (US)

( * ) Notice: Subject to any disclaimer, the term of this patent is extended or adjusted under 35 U.S.C. 154(b) by 0 days.

(21) Appl. No.: 17/507,780

(22) Filed: Oct. 21, 2021

Related U.S. Application Data

(63) Continuation-in-part of application No. 16/873,260, filed on Mar. 6, 2020, now Pat. No. 11,322,323.

(60) Provisional application No. 62/856,620, filed on Jun. 3, 2019.

(51) Int. Cl.
*H01H 36/02* (2006.01)
*G08B 21/20* (2006.01)
*G01M 3/40* (2006.01)

(52) U.S. Cl.
CPC .............. *H01H 36/02* (2013.01); *G01M 3/40* (2013.01); *G08B 21/20* (2013.01)

(58) Field of Classification Search
CPC .......... H01H 36/02; G01M 3/40; G08B 21/20
See application file for complete search history.

(56) References Cited

U.S. PATENT DOCUMENTS

| | | | |
|---|---|---|---|
| 3,052,778 A | 9/1962 | Kathe | |
| 3,273,091 A * | 9/1966 | Wales, Jr. | .......... H01H 36/0073 336/DIG. 1 |
| 3,743,980 A | 7/1973 | Steiner | |
| 4,056,979 A * | 11/1977 | Bongort | .................. G01F 23/74 73/DIG. 5 |
| 4,489,297 A * | 12/1984 | Haydon | ............. H01H 36/0073 200/557 |
| 6,140,925 A * | 10/2000 | Lee | ........................ G01F 23/74 340/623 |
| 6,442,955 B1 * | 9/2002 | Oakner | .................. H01H 36/02 340/618 |
| 6,550,264 B1 | 4/2003 | Cantolino | |
| 6,895,771 B1 | 5/2005 | Cantolino | |
| 6,992,259 B1 | 1/2006 | Cantolino | |

(Continued)

FOREIGN PATENT DOCUMENTS

WO    WO2006052250 A1    5/2006

*Primary Examiner* — Bernard Rojas
(74) *Attorney, Agent, or Firm* — Dentons US LLP

(57) ABSTRACT

A float switch used for system shut-off and/or alarm activation in response to fluid detection. A clamp connects the switch's protective housing to a fluid-collection pan wall, with the switch comprising a pivoting float assembly having a magnet originally positioned out-of-phase to an upper magnet on a toggle, a contact spring and ferrous pin also diminishing attraction of the magnets toward one another until the float assembly is sufficiently raised by accumulated fluid to force the upper magnet away from the ferrous pin and instead engage the lower magnet, the toggle promptly shifting position so that its opposite end may close a circuit that activates an alarm, remote notification, or other communication/control. The exponential increase in attractive force between the magnets as they draw near to one another results in a very rapid snap action that reduces malfunction. Manual reset of the toggle and float are required for continuing/repeat use.

26 Claims, 14 Drawing Sheets

(56) References Cited

U.S. PATENT DOCUMENTS

| | | | | |
|---|---|---|---|---|
| 6,992,260 | B1 | 1/2006 | Cantolino | |
| 7,067,750 | B1 * | 6/2006 | Cantolino | H01H 35/18 200/84 R |
| D527,793 | S | 9/2006 | Cantolino | |
| D562,963 | S | 2/2008 | Cantolino | |
| 7,334,421 | B1 | 2/2008 | Cantolino | |
| 7,389,651 | B2 | 6/2008 | Cantolino | |
| 7,637,387 | B1 | 12/2009 | Cantolino | |
| 7,673,646 | B1 | 3/2010 | Cantolino | |
| 7,710,283 | B1 * | 5/2010 | Cantolino | B60H 1/3225 340/623 |
| 7,744,395 | B1 | 6/2010 | Cantolino | |
| D630,709 | S | 1/2011 | Cantolino | |
| 7,878,019 | B2 | 2/2011 | Cantolino | |
| 7,896,301 | B1 | 3/2011 | Cantolino | |
| 7,900,795 | B1 | 3/2011 | Cantolino | |
| 7,967,267 | B1 * | 6/2011 | Cantolino | F24F 13/222 248/231.61 |
| 8,100,140 | B1 | 1/2012 | Cantolino | |
| 8,151,621 | B1 | 4/2012 | Cantolino | |
| 8,154,313 | B1 | 4/2012 | Cantolino | |
| 8,169,314 | B2 | 5/2012 | Cantolino | |
| 8,220,768 | B1 | 7/2012 | Cantolino | |
| 8,317,169 | B1 | 11/2012 | Cantolino | |
| 8,319,626 | B1 | 11/2012 | Cantolino | |
| 8,461,493 | B1 | 6/2013 | Cantolino | |
| 8,561,417 | B1 | 10/2013 | Cantolino | |
| 8,578,770 | B2 | 11/2013 | Cantolino | |
| 8,844,353 | B2 * | 9/2014 | Hsiao | H01H 35/18 73/317 |
| 8,973,437 | B2 | 3/2015 | Cantolino | |
| 9,038,405 | B2 | 5/2015 | Cantolino | |
| 9,105,175 | B1 | 8/2015 | Cantolino | |
| 9,249,981 | B2 * | 2/2016 | Sada | F24F 11/52 |
| 9,503,015 | B2 | 11/2016 | Cantolino | |
| 11,322,323 | B1 * | 5/2022 | Cantolino | H01H 36/0073 |
| 2005/0166613 | A1 * | 8/2005 | Oakner | F24F 13/222 62/150 |
| 2006/0042918 | A1 | 3/2006 | Cantolino | |
| 2006/0222508 | A1 | 10/2006 | Cantolino | |
| 2011/0181380 | A1 * | 7/2011 | Iwata | H01H 23/168 335/63 |
| 2012/0053736 | A1 | 3/2012 | Cantolino | |
| 2012/0219428 | A1 | 8/2012 | Cantolino | |
| 2014/0008253 | A1 | 1/2014 | Cantolino | |
| 2014/0102123 | A1 | 4/2014 | Cantolino | |
| 2015/0000193 | A1 | 1/2015 | Cantolino | |
| 2015/0082697 | A1 | 3/2015 | Cantolino | |

* cited by examiner

LATCHING MAGNETIC FLOAT SWITCH

CROSS-REFERENCES TO RELATED APPLICATIONS

This patent application is a continuation-in-part (CIP) of U.S. utility patent application Ser. No. 16/873,260 filed Mar. 6, 2020, which claims a benefit of priority to U.S. provisional patent application 62/856,620, filed Jun. 3, 2019, each of which is incorporated by reference herein for all purposes.

BACKGROUND OF THE INVENTION—FIELD OF THE INVENTION

This invention relates to fluid sensing devices used to shut off a fluid-producing system and/or activate an alarm in response to the detection of fluid unexpectedly released beyond a threshold amount determined to place the system and/or its surroundings at risk for damage, specifically to a latching magnetic float switch that can be easily supported and stabilized by a pivoting clamp arm against either the straight wall of a metal fluid collection pan or an angled wall of a plastic fluid collection pan in fluid communication with a fluid-producing system to receive surplus water and/or condensate from it, such as but not limited to an air conditioner or furnace unit. The present invention float switch has improved float assembly structure that provides a rapid/snap-action system shut-off due in part to the initial out-of-phase positioning between an upper magnet associated with one end of a toggle and a lower magnet seated on or in the upper portion of a pivotable float assembly while the present invention is in the RUN state. The upper/toggle magnet is also maintained in its RUN state via magnetic attraction to a metal pin (such as, but not limited to, a socket screw) located above it and at least one coil spring below the toggle, until sufficient fluid is released to raise the float body, float frame, and the float magnet into a position where the magnetic attraction between the upper and lower magnets overcomes the magnetic attraction of the upper/toggle magnet to the metal pin, and also overcomes the upward force of the spring affecting the end of the toggle supporting the upper magnet. When this change in magnetic attraction occurs, the upper magnet drops quickly and sharply downward, becoming locked against the lower magnet and creating a TRIPPED state that shuts off power to an associated fluid-producing system, appliance, or controller. The upper and lower magnets stay in contact with one another until manually reset. The dropping upper magnet also raises the opposite end of the toggle, the upward movement of which can be assisted by a second coil spring, which can then cause a circuit to close and activate an alarm, remote notification, or other communication/control. In summary, in the RUN state, the upper toggle magnet is attracted to the ferrous pin and the contact spring applies force to rotate the toggle upward against the pin/contact, while the lower float magnet is angled away from, and out of alignment with, the upper toggle magnet, making their magnetic fields less attractive. In contrast, in the TRIPPED state, the rising level of collected fluid in the pan and moving through openings in the base plate secured to the bottom end of the float housing moves the float assembly, raising it and its associated float magnet closer to the upper toggle magnet, and also closer into vertical alignment with the upper toggle magnet, which increasingly accelerates magnetic attraction between the float magnet and the toggle magnet. When the magnetic attraction between the toggle and float magnets becomes greater than the combined upward contact spring force against the bottom surface of the toggle and upward magnet attraction of the upper toggle magnet to the metal pin positioned above the upper magnet, the exponential increase in attractive force resulting between the upper and lower magnets as they draw near to one another causes a very rapid snap action as they come together. Thus, the forceful attraction exhibited between upper and lower present invention magnets is multiplied by other structure not present in the prior art, and the stronger magnetic attraction created through a multiplication of factors (and not simply the buoyancy of a lightweight float body) provides enhanced reliability over prior art fluid sensor devices for a trouble-free and reproducible/strong snap-locking action between the two magnets and reduced switch malfunction during long-term use.

BACKGROUND OF THE INVENTION—DESCRIPTION OF THE RELATED ART

The inventions thought to be the closest to the present invention are those previously created by the inventor herein and which are currently protected by U.S. Pat. No. 7,710,283 B1 to Cantolino (May 4, 2010) and U.S. Pat. No. 7,967,267 B1 to Cantolino (Jun. 28, 2011). Although each of the prior Cantolino switches mentioned above are also latching switches which need to be reset after entering a TRIPPED state, neither has the same rapid/snap-action promoting structure as the present invention herein with a lower magnet originally positioned out-of-phase to an upper magnet on a toggle, a contact spring and ferrous pin also diminishing attraction of the magnets toward one another until the float assembly is sufficiently raised by accumulated fluid to force the upper magnet away from the ferrous pin and instead move rapidly to engage the lower magnet, and as a result providing faster and more stable installation, and a more reliable and reproducible shut-off response for reduced malfunction during long-term use. There is no known invention with the same structure and benefits provided by the present invention.

SUMMARY OF THE INVENTION

The primary objective of this invention is to provide a float switch activated by a strong magnetic attraction created through a multiplication of factors, and not simply the buoyancy of a lightweight float body, which confers enhanced reliability over prior art switches for a trouble-free and reproducible/strong snap-locking action between the two magnets brought together in a TRIPPED state, and reduced malfunction during long-term use. It is a further object of this invention to provide a float switch that is easily installed, has reliable operation for extended periods of time with little or no post-installation inspection or maintenance, and is easily tested at any time to ascertain that it is in proper working order. It is also an object of this invention to provide a float switch that effectively operates when only a small threshold amount of fluid is present. In addition, it is an object of this invention to provide a float switch with sturdy and rugged construction, as well as stable mounting to a pan wall so that little or no deviation from its originally installed position occurs during extended periods of use. It is also an object of this invention to provide a float switch that is made from corrosion-resistant materials that resist premature deterioration and malfunction. A further object of this invention is to provide a float switch made of materials able to reliably operate in temperature extremes. It is also an object of this invention for its housing to protect its float assembly from airborne debris, airlock, reduces lean-in of fluid-collection pan walls at the site of present invention installation.

The present invention has a pivoting clamp and only one easily hand-manipulated fastener/nut (or other rotatable knob) combination for easy installation optionally against the wall of a plastic or metal fluid collection pan. The sturdy and rugged construction of its housing and clamp fixes the present invention in a stable and immobile mounting position against to a pan wall and reduces the amount of lean-in of fluid-collection pan wall at the site of present invention installation, a known problem in the prior art. As a result, little or no deviation from its originally installed position occurs during extended periods of use, increasing the reliability of switch function. Also, an indicator on the vertically moving end of the float assembly frame (remote from its anchored/pivoting end) allows for easy testing at any time to ascertain that the present invention is in proper working order. The present invention is configured to operate when only a small threshold amount of fluid is present, is made from corrosion-resistant materials that resist premature deterioration and malfunction, is also made of materials able to reliably operate in temperature extremes, and its housing protects its float assembly from airborne debris and lock. The combination of advantages and benefits provided by the present invention herein is not known in the prior art.

BRIEF DESCRIPTION OF THE SEVERAL VIEWS OF THE DRAWINGS

FIG. 2 also shows the configuration of the cap top and wiring harness that are part of the most preferred embodiment of the present invention.

FIG. 11 also shows the non-elevating end of the float frame secured to the float pivot at one end of the interior surface of the base plate and the upwardly elevating end of the float frame having an elongated configuration adapted for extension through the float housing's channel for use to reset positioning of the float and it supported float magnet from the TRIPPED state to the RUN state.

COMPONENT LIST

Figure 1:
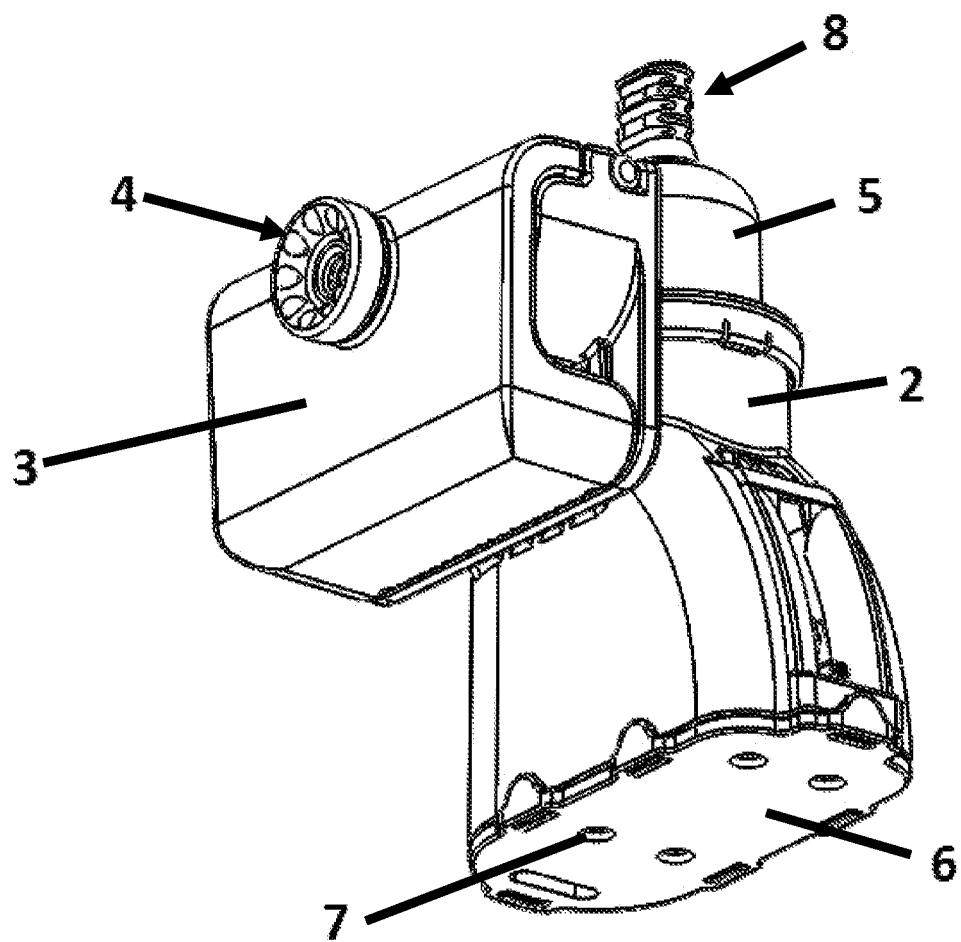
FIG. 1 is a perspective view from the bottom and clamp side of the most preferred embodiment of the present invention latching magnetic float switch showing multiple fluid passage openings through the base plate of its float assembly, the base plate being secured to the bottom end of a float housing also having a top end supporting a cap top with a wiring harness extending upwardly from the cap top, the float housing also having an open/vertical channel through which a trip indicator associated with the pivoting float assembly extends to identify the current operational state of the switch (TRIPPED or RUN), and FIG. 1 also showing a clamp with an enlarged hand-manipulated nut (or knob) and fastener combination connected to the float housing to secure it to the wall of a fluid collection pan in a fixed position of use for reliable extended operation.
Figure 2:
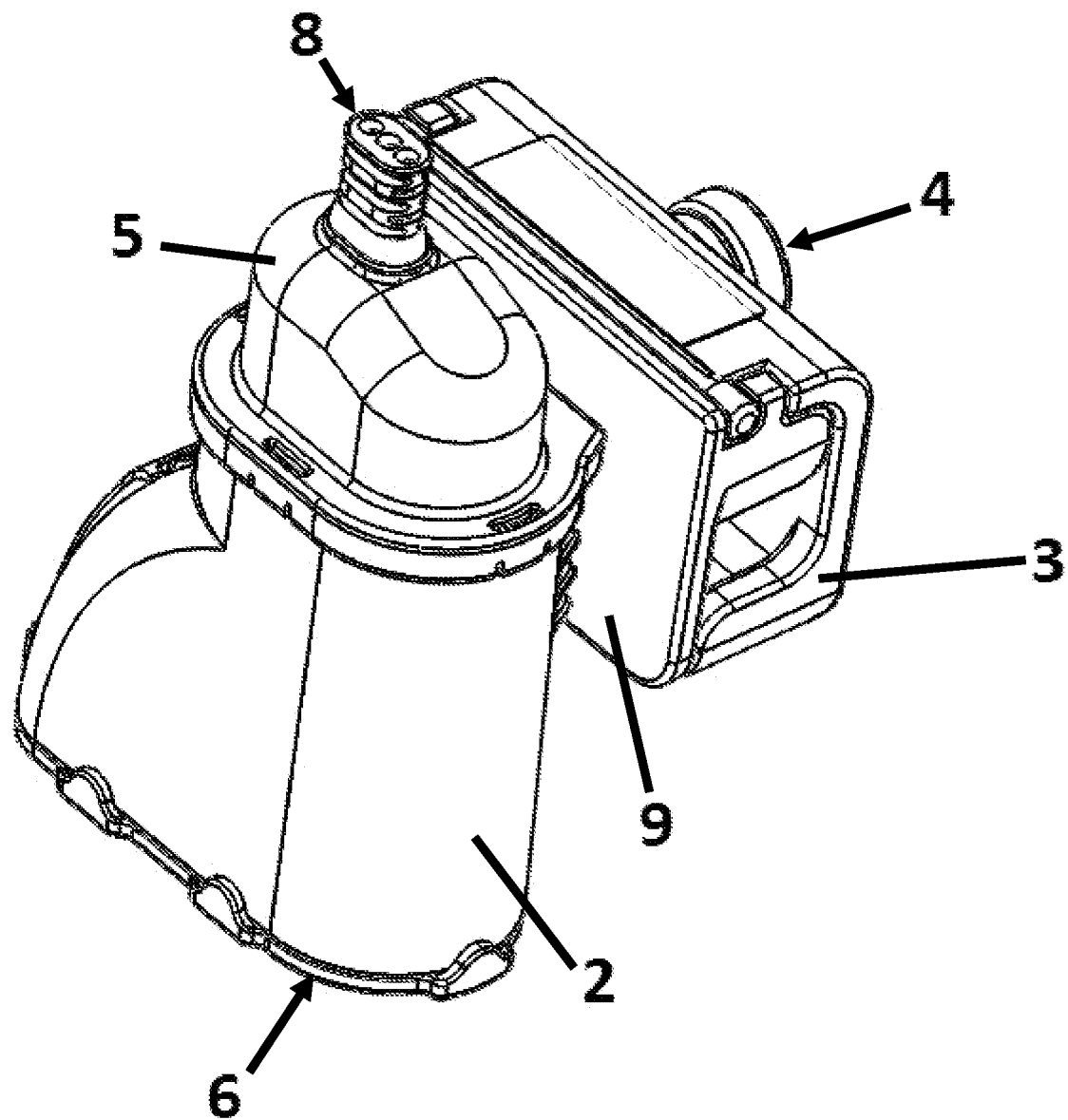
FIG. 2 is a perspective view from the top and float housing side of the invention in FIG. 1, showing the clamp base to which the pivotably rotatable C-shaped clamp arm is pivotally attached.

1—latching magnetic float switch
2—float housing (float assembly 29, toggle 31, electrical contacts 22, and magnets 34/35 are protected inside float housing 2)
3—pivoting clamp arm (preferably has integral pivot pin 12 and pivots upwardly relative to clamp base 9)
4—hand-manipulated nut used with externally threaded fastener 16 (sometimes referred to by the term 'knob')
5—cap top (fits over the top end of float housing 2 and supports wiring harness 8)
6—base plate of float assembly 29 (secured to the bottom end of float housing 2 with at least one snap-fit tab 30)
7—fluid openings through base plate 6
8—wiring harness in electrical communication between electrical contacts 22 and a system, appliance, and/or controller (not shown) for shutting off the source of rising water detected by the latching magnetic float switch 1
9—clamp base (used with rotatable clamp arm 3 to fix float housing 2 into its desired position of use on the wall of a fluid collection pan)
10—trip indicator (float assembly 29 moves it between elevated positioning for the TRIPPED state and lowered positioning for the RUN state and it extends through channel 18 to assume positioning that identifies the current RUN or TRIPPED state of float switch 1)
11—hole/gap in between clamp arm 3 and clamp base 9 (allows nut/knob 4 to engage the threads of fastener 16 and move clamp arm 3 downwardly toward clamp base 9 to securely fix float housing 2 against the wall of a fluid collection pan in a desired position of use)
12—integral pivot pin (opposed pivot pins on the top edge of the C-shaped clamp arm 3 engage the receiving notches 13 in the rear top surface of clamp base 9)
13—receiving notches for pivot pins 12
14—non-slip/gripping surface on clamp base 9 and clamp arm 3 (may comprise ridges, over-mold, and/or resilient material)
15—hollow receptacle outwardly extending from clamp base 9 that prevents the head 17 of fastener 16 from rotation when nut 4 engages fastener 16 to close clamp arm 3 against clamp base 9 and securely fix float housing 2 into its desired position of use.
16—externally-threaded fastener (with nut/knob 4 it secures clamp arm 3 after pivoting movement toward the wall of a fluid collection pan and into a fixed relation with clamp base 9)
17—hex head of externally-threaded fastener 16 (steadies fastener 16 for its engagement with nut/knob 4, can be any shape that does not allow fastener 16 to rotate while nut/knob 4 is being tightened against it)
18— channel in float housing 2 for movement of trip indicator 10
19— strengthening ribs on clamp base 9 (helps float housing 2 to maintain steady positioning relative to the wall of a fluid collection pan during use)
20— gap between clamp arm 3 and clamp base 9 (allows a firm grip of clamp arm 3 against the exterior surface of the wall of a metal or plastic fluid collection pan)
21— socket screw (attracts upper magnet 34 and draws it upward and away from lower magnet 35 during the RUN state)
22— electrical contacts (supported by toggle 31 and used to open and close electrical communication through electrical wiring harness 8)
23— spring (at least one is connected to the bottom surface of toggle 31)
24— terminal block (supports toggle 31 and other components affecting the movement of upper magnet 34)
25— float foam (provides buoyancy for float assembly)
26— upper float piece (helps to maintain fixed positioning of the lower float magnet 35 within float foam 25 during movement of float magnet 35 between its lowered RUN and elevated TRIPPED positioning
27—float pivot (integral to the interior surface of base plate 6 and engages the non-elevating end of float frame 28)
28— float frame (its elongated configuration supports float foam 25 and float magnet 35, one end engages float pivot 27 and its opposing end extends through channel 18 and moves trip indicator 10 from it lowered RUN positioning to its elevated TRIPPED positioning)
29— float assembly (comprises float foam 25, float frame 28, upper float piece 26, float pivot 27, and base plate 6 with snap fit tabs 30)
30— snap fit tab (used for secure connection of base plate 6 to the bottom end of float housing 2)
31— toggle (supports electrical contacts 22, at least one spring 23, and upper toggle magnet 34)
32— magnet housing (attaches to toggle 31 for securing and maintaining upper/toggle magnet 34 in its desired position of use)
33— retainer pin (separates and supports fixed positioning of electrical contacts 22 relative to toggle 31)
34— toggle magnet (fixed in location on one end of toggle 31 by a magnet housing 32)
35— float magnet (fixed in its location of use between float foam 25 and upper float piece 26)
36— pillar support (holds float magnet 35 in fixed positioning relative to float foam 25)
37— lower float support (helps to give pillar support 36 fixed positioning during movement of float magnet 35 to and from elevated TRIPPED positioning and lowered RUN positioning)

DETAILED DESCRIPTION OF THE INVENTION

The present invention is a latching magnetic float switch 1 that can be easily supported and stabilized by a pivoting clamp arm 3 against the wall of a plastic or metal fluid collection pan (not shown) when the pan is positioned in fluid communication with a fluid-producing system, such as but not limited to an air conditioner or furnace unit (not shown). The present invention float switch 1 has improved float assembly 29 structure that provides rapid/snap-action system shut-off, including initial out-of-phase positioning between an upper toggle magnet 34 mounted on one end of a toggle 31 and a lower float magnet 35 associated with the topmost portion of the float assembly 29. The upper/toggle magnet 34 is also maintained in its RUN state via magnetic attraction to a metal pin 21 above it and at least one coil spring positioned 23 below toggle 31, until fluid release into the collection pan to which float housing 2 is secured via clamp arm 3 and clamp base 9 sufficiently raises float foam 25 and its frame 28 to TRIPPED positioning where the magnetic attraction between the two magnets (34 and 35) overcomes the magnetic attraction of the upper/toggle magnet 34 to the pin 21 above it, and also overcomes the upward force of the spring 23 affecting the end of toggle 31 supporting upper magnet 34. When this change in magnetic attraction occurs, upper magnet 34 drops quickly in elevation and sharply downward in a fast snapping action, thereby becoming locked securely against lower magnet 35, which shuts off the associated fluid-producing system (not shown). The upper and lower magnets (34 and 35) stay in strong contact with one another until manually reset. The dropping upper magnet 34 also raises the opposite end of the toggle 31, the upward movement of which can be assisted by a second coil spring 23, which can also cause a circuit to close and activate an alarm, remote notification, or other communication/control (not shown). In summary, in the RUN state, the toggle magnet 34 is attracted to the ferrous pin 21 and the contact spring 23 applies force to rotate the toggle 31 in contact with the pin/contact 21, while the lower float magnet 35 is positioned out of alignment with the toggle magnet 34, making their magnetic fields less attractive. Further in the RUN state, the lowered float magnet 35 is positioned laterally away from the upper toggle magnet 34, which additionally reduces the attractive influence of each magnet (34 and 35) upon the other. In contrast, in the TRIPPED state, the water level under the float assembly 29 has raised it and moved the float magnet 35 closer to the toggle magnet 34, and also closer into alignment with the toggle magnet 34 that allows the magnetic attraction between the toggle and float magnets (34 and 35) to become greater than the combined upward contact spring 23 force directed on toggle 31 and the magnet attraction of the toggle magnet 34 to the pin 21, the exponential increase in attractive force between the magnets (34 and 35) at the time they draw near to one another results in a very rapid snapping action when they make contact with one another. Thus, the forceful attraction exhibited between upper and lower present invention magnets (34 and 35) is multiplied by other structure not present in the prior art, and the stronger magnetic attraction created through a multiplication of factors (and not simply the buoyancy of a lightweight float body 25) provides enhanced reliability over prior art fluid sensor devices for a trouble-free and reproducible/strong snap-locking action between the two magnets (34 and 35) and reduced malfunction during long-term use.

Figure 3:
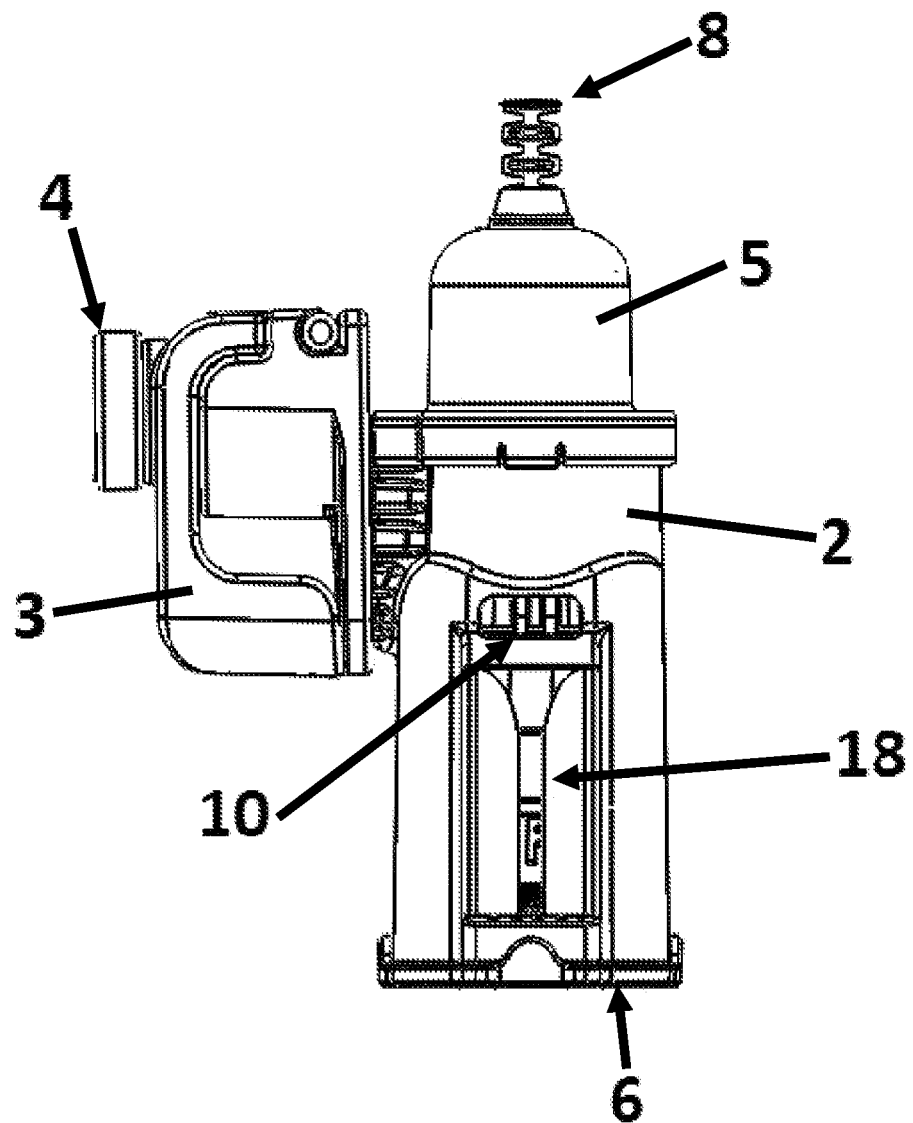
FIG. 3 is a side view of the invention in FIGS. 1 and 2, which shows the C-shaped clamp arm in a closed position against the clamp base and the trip indicator in a raised position that identifies a TRIPPED state.
Figure 4:
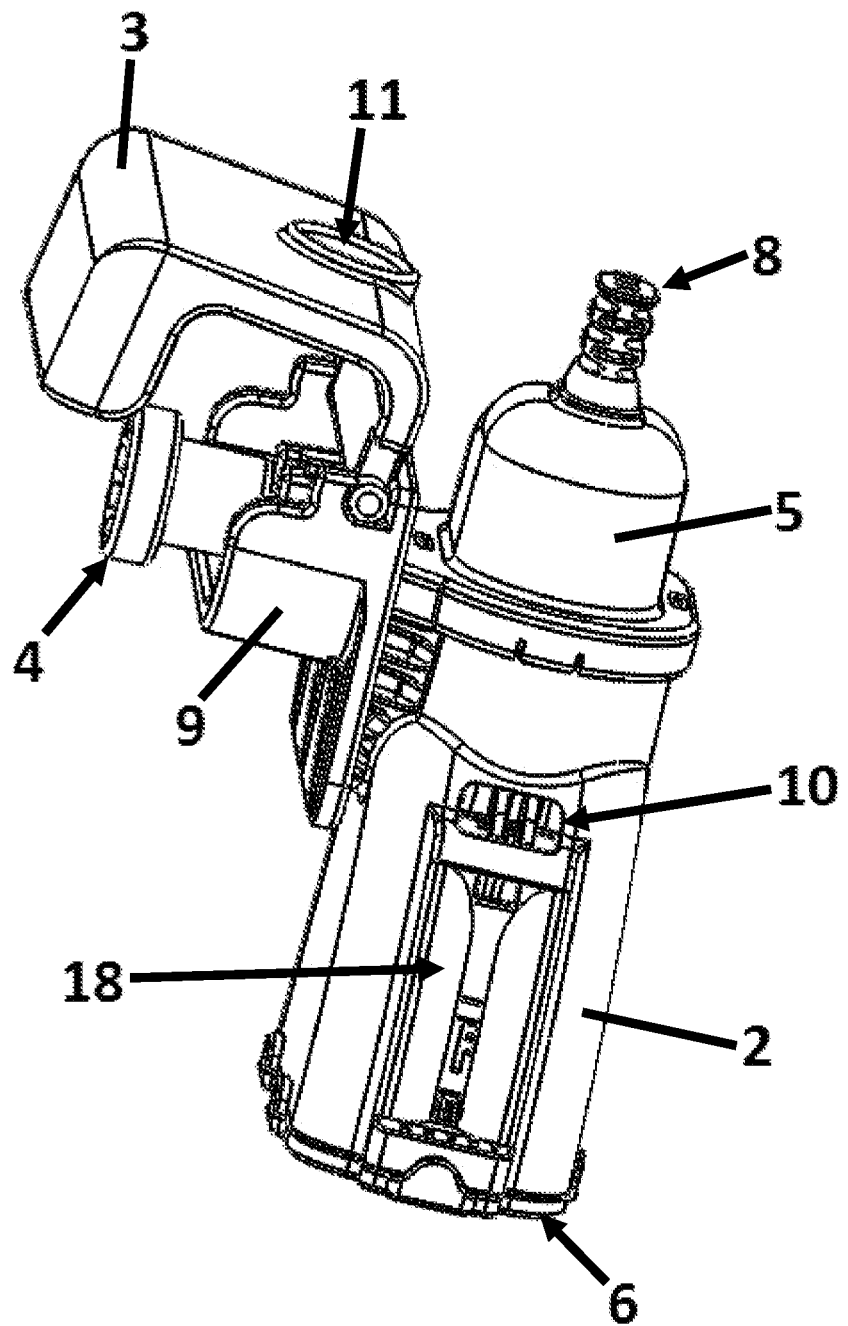
FIG. 4 is a side view of the clamp arm shown in FIGS. 1-3 in an upwardly pivoted position relative to its clamp base, wherein the opposed integral pivot pins of the clamp arm can be lifted upwardly away from the receiving notches on the top rear portion of clamp base. The clamp arm is configured so that its cannot be separated from the clamp base unless rotated into an upwardly-extending position similar to that shown in FIG. 4.

FIGS. 1-4 show exterior views of the most preferred embodiment of the present invention float housing 2, cap top 5, clamp arm 3, and clamp base 9. FIG. 1 is a perspective view showing fluid passage openings 7 through the base plate 6 of float assembly 29 and secured to the bottom end of float housing 2. A plurality of stabilizing feet (not shown) may be used on the exterior bottom surface of base plate 6, but are not critical or shown in FIG. 1. FIGS. 1-4 also show an enlarged hand-manipulated nut/fastener (4, 16) combination connecting clamp arm 3 against the clamp base 9 depending from float housing 2. In addition, FIGS. 1-4 show a cap 5 covering the top end of float housing 2 and a wiring harness 8 extending from the top portion of cap top 5. FIGS. 3 and 4 further show a trip indicator 10 near channel 18, while FIG. 4 shows the clamp arm 3 in an upwardly pivoted position relative to clamp base 9 that allows clamp arm 3 to be lifted vertically for separation from clamp base 9.

Figure 5:
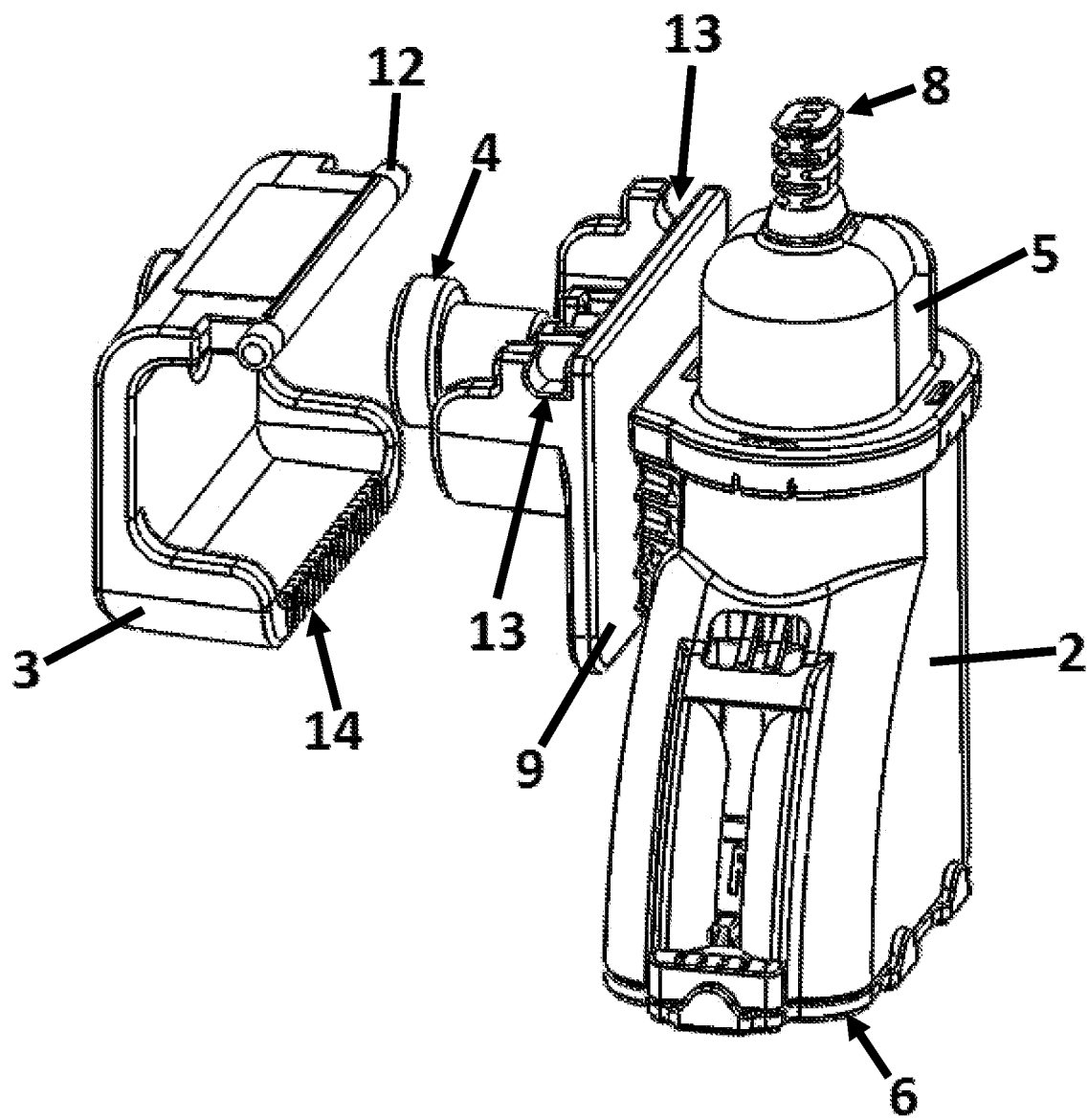
FIG. 5 is a side view of the invention in FIGS. 1-4, with the C-shaped clamp arm separated from the clamp base and showing the receiving notches used to engage and secure the opposed integral pivot pins of the clamp arm, and FIG. 5 further showing a lower non-slip/textured surface on the lower end of the clamp arm that helps to fix the latching magnetic float switch firmly over and against the wall of a fluid collection pan. A similar non-slip/textured surface is shown (but not marked by the number 14) in FIG. 4. The non-slip/textured surface may be integral or added overmold.
Figure 6:
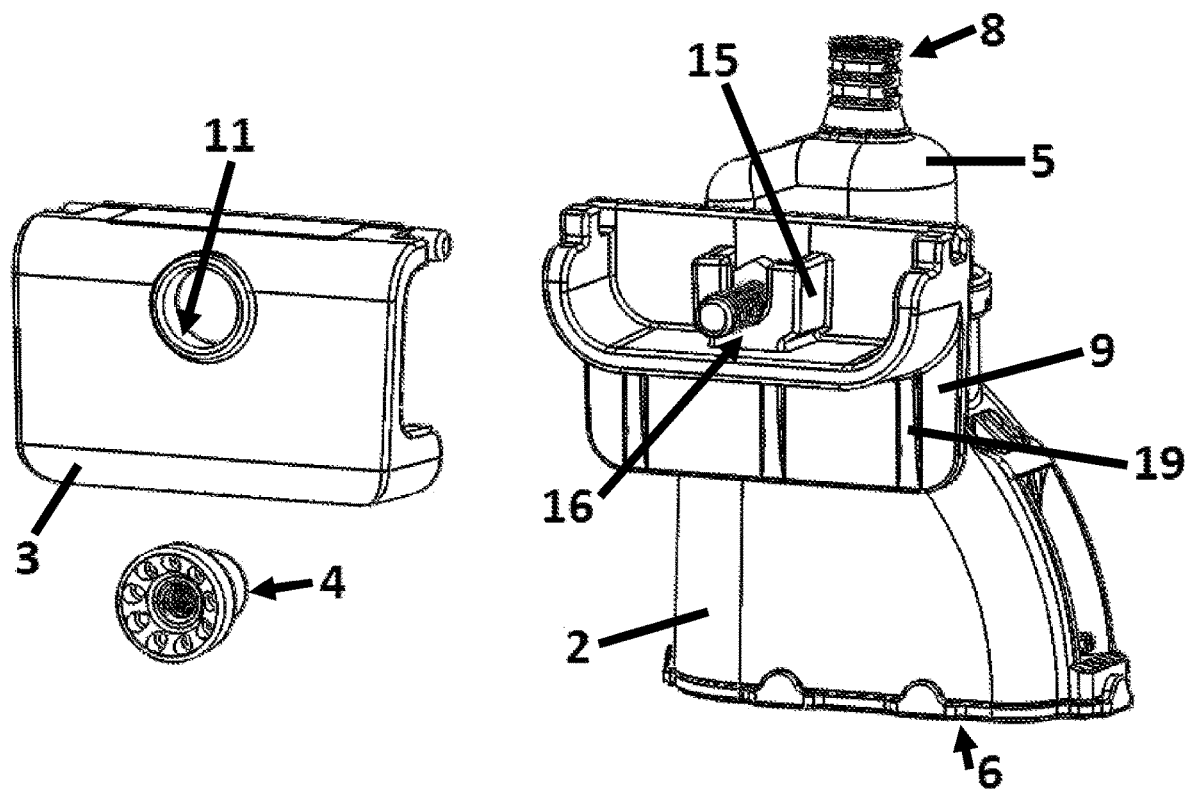
FIG. 6 is a view of the invention in FIGS. 1-5 from its clamp side, and showing the clamp arm separated from the clamp base and the nut/knob separated from the externally-threaded fastener, the head of the fastener remaining in the hollow receptacle extending outwardly from the central portion of the interior surface of the clamp base, the head being removed from the receptacle only by sliding it in an upwardly direction once the clamp arm has been separated from the clamp base. The hollow receptacle also preventing rotation of the fastener as the nut/knob is secured to it to tighten the clamp arm and clamp base together against the wall of a fluid collection pan.
Figure 7:
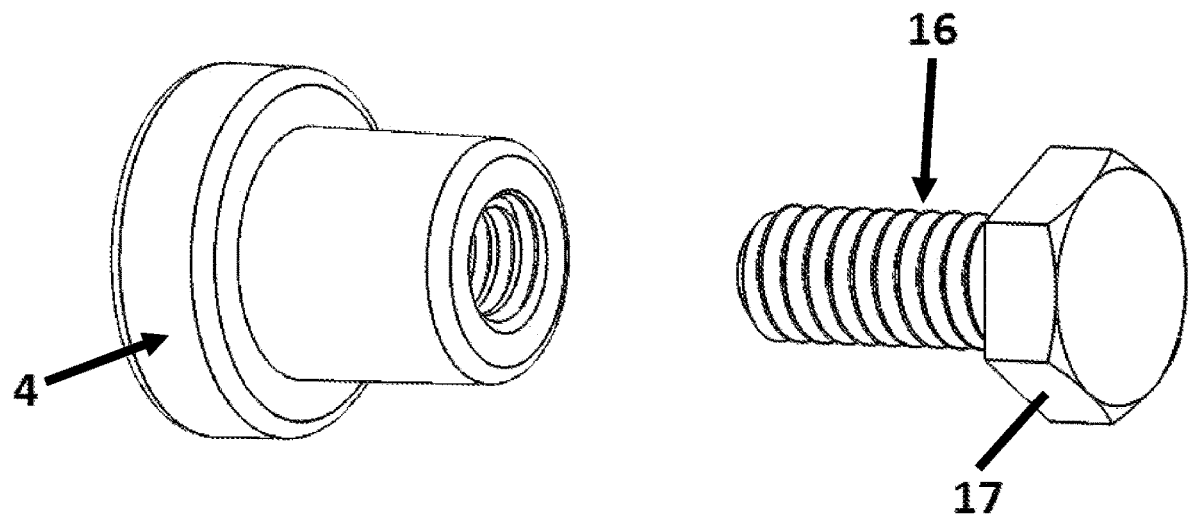
FIG. 7 is an enlarged side view of the hand-manipulated nut and fastener shown in FIGS. 1-6 and used in the most preferred embodiments of the present invention.

FIGS. 5-7 show more detail about the clamp arm 3 connection to clamp base 9 and the ease with which it can be connected and removed from clamp base 9. FIG. 5 is a side view of the invention in FIGS. 1-4, and showing the pivot pin 12 of clamp arm 3 separated from the receiving notches 13 on the rear top surface of clamp base 9. The hand-manipulated nut/knob 4 is still in its position of use in FIG. 5. FIG. 6 is a view of the invention in FIGS. 1-5 and rotated 90-degrees from that shown in FIG. 5, wherein the clamp arm 3 is also removed from clamp base 9, and hand-manipulated nut/knob 4 is removed from its connection with externally-threaded fastener 16. However, the head 17 of fastener 16 remains within the hollow receptacle 15 outwardly extending from clamp base 9 wherein release of head 17 from hollow receptacle 15 requires an applied upward force to slide head 17 upwards and away from hollow receptacle 15. In contrast, FIG. 7 is an enlarged side view of the hand-manipulated nut/knob 4 and the fastener 16 with a hex head 17 that when positioned within hollow receptacle 15 cannot rotate, facilitating attachment of nut/knob 4 to fastener 16 for securing clamp arm 3 and clamp base 9 over and against the top of a fluid collection pan wall (not shown) without any lean-in that could otherwise diminish the reliability of float switch 1 response to fluid accumulation in the associated collection pan.

Figure 8:
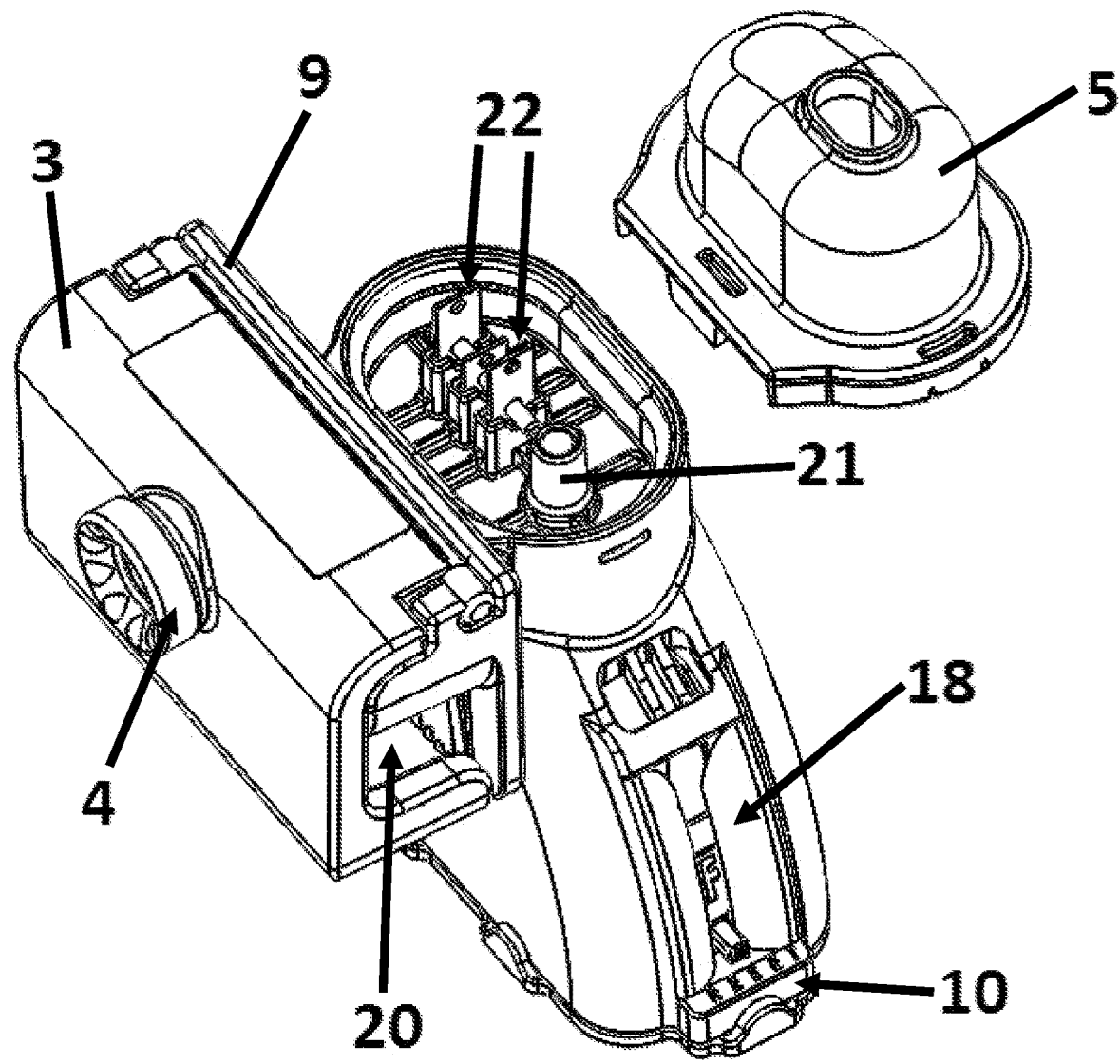
FIG. 8 is a top perspective view of the invention in FIGS. 1-7 and its cap top removed from the float housing to reveal electrical contacts and a socket screw supported upon a terminal block.
Figure 9:
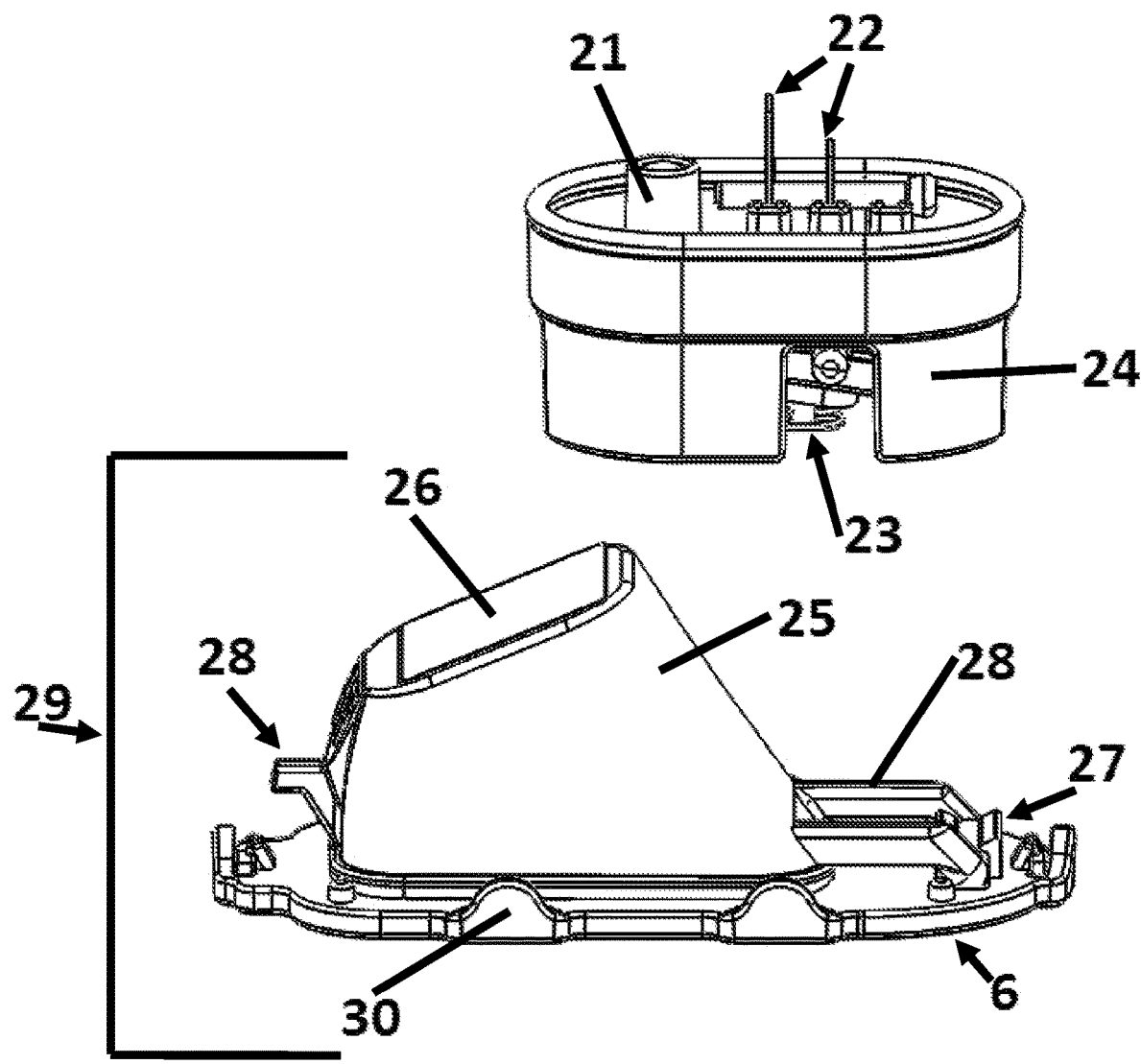
FIG. 9 is a perspective view from the top of the terminal block and float assembly used in the most preferred embodiment of the present invention latching magnetic float switch, each housing a different one of the two magnets used to achieve a TRIPPED state.
Figure 10:
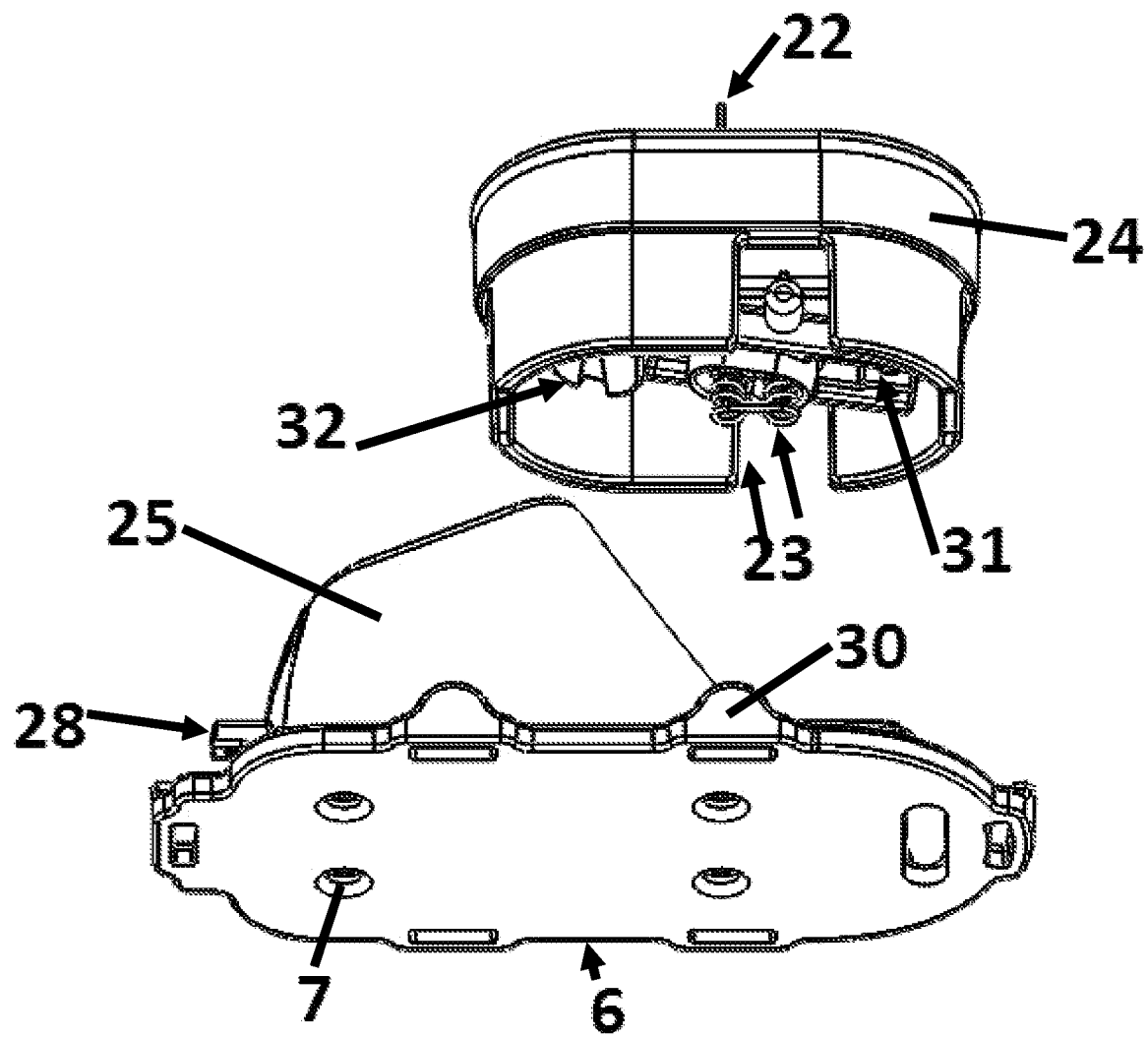
FIG. 10 is a perspective view from the bottom of the terminal block and float assembly in FIG. 9, the terminal block revealing two springs and an upper magnet secured to a toggle bar, with FIG. 10 also showing the base plate with fluid passage openings that supports the buoyant float foam material and float frame that are also part of the float assembly.
Figure 11:
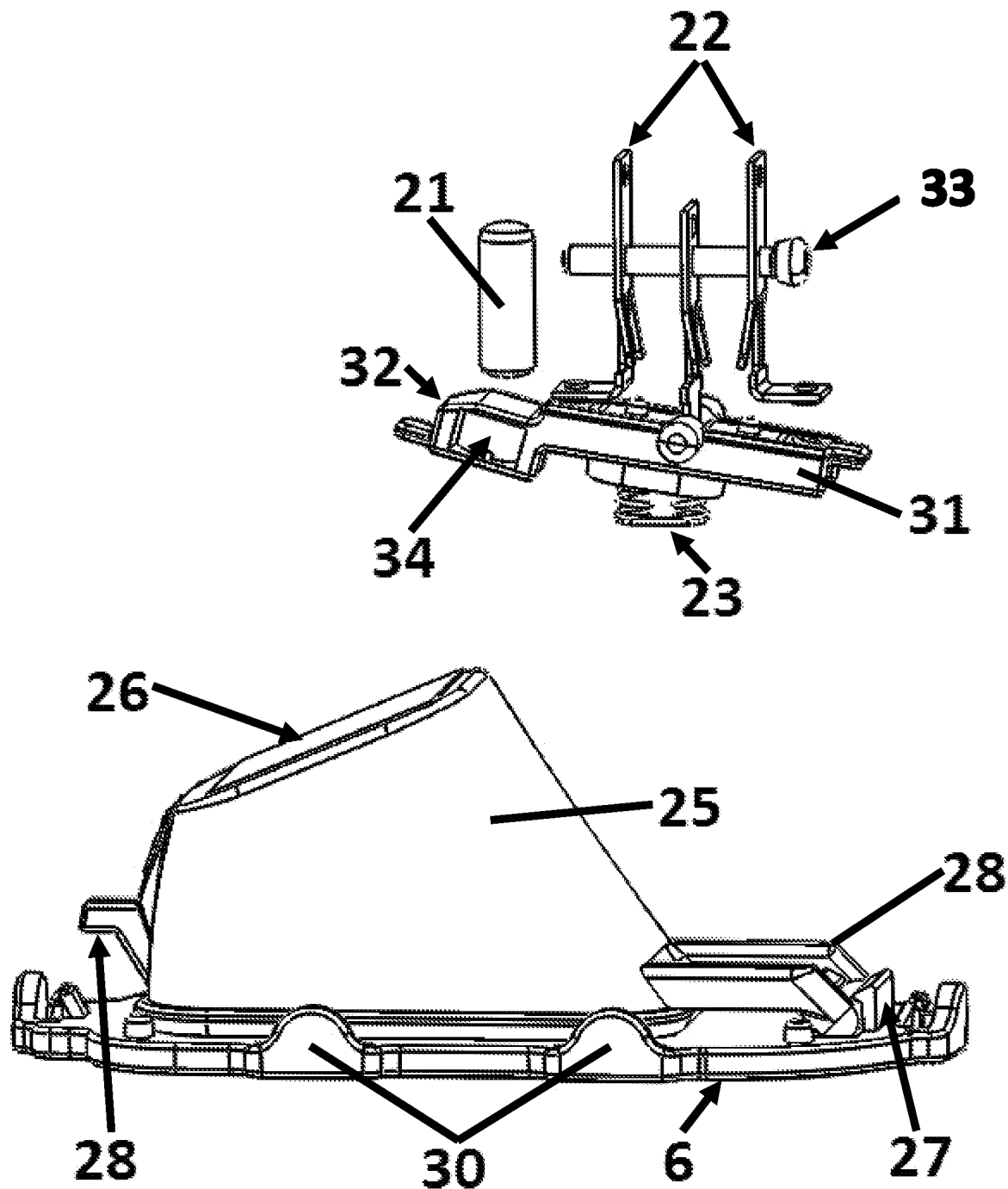
FIG. 11 is a perspective view from the side of the present invention structure in FIG. 10, but with the terminal block removed and showing two springs under the toggle bar, an upper magnet secured to one end of the toggle bar using a magnet housing, a metal socket screw/pin positioned above the upper magnet, electrical contacts used to open and close electrical communication with the wiring harness also positioned above the toggle, and a retainer pin used for separating and maintaining fixed positioning of the electrical contacts relative to the toggle.
Figure 12:
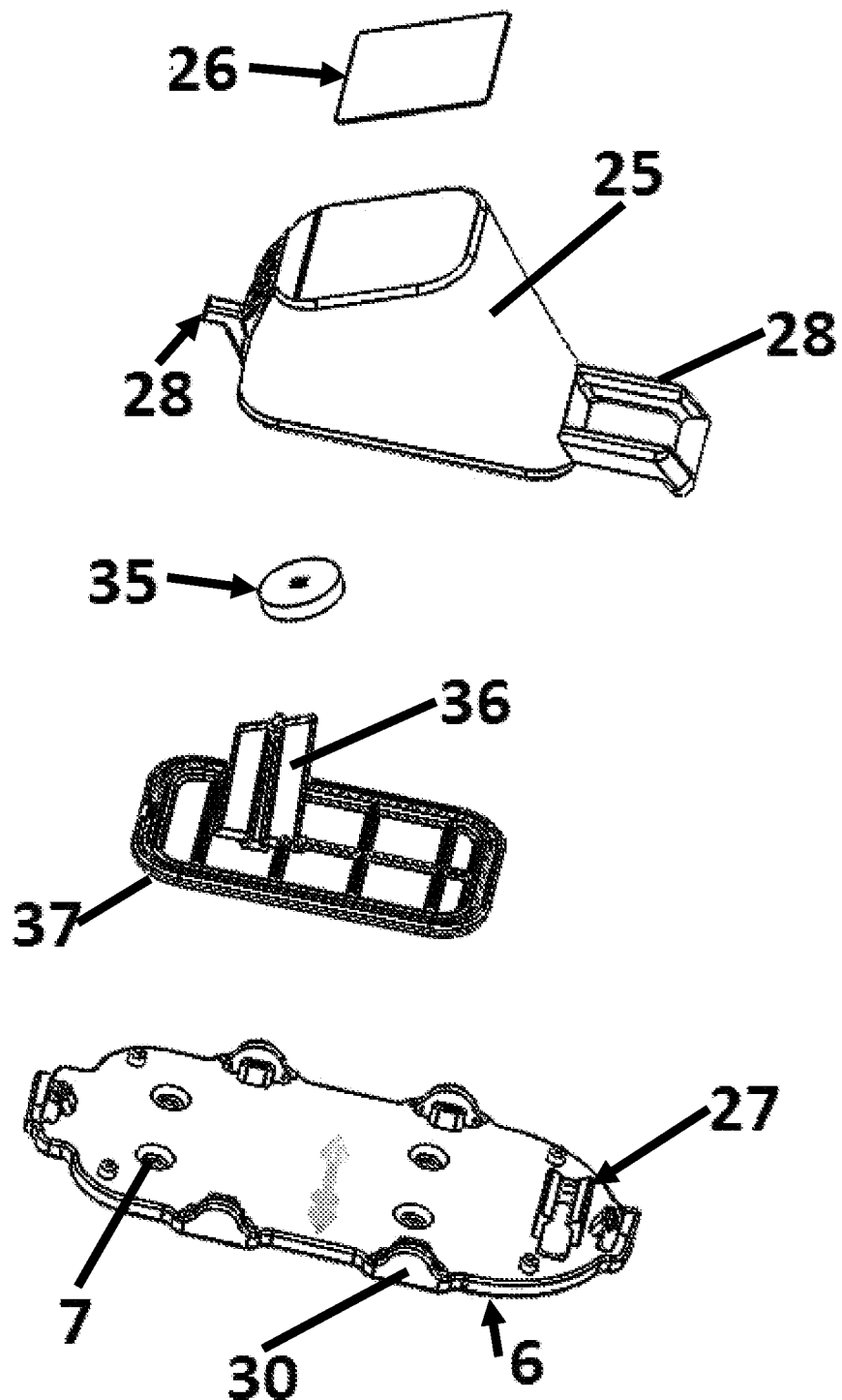
FIG. 12 is an exploded view of the float assembly shown in FIG. 11 for the most preferred embodiment of the present invention, including buoyant float foam having a lower end length dimension greater than that of its .upper end, a float frame supporting the float foam, an upper float piece used to secure the float magnet against the top portion of the float foam, a lower float support establishing fixed position of a pillar support use to provide fixed float magnet positioning relative to the float foam, and a base plate with fluid openings and integrated float pivot and snap-fit tabs for use in attachment of the base plate to the bottom end of the float housing.

FIGS. 8-12 show more detail about the portion of float housing 2 supporting the toggle and float magnets (34 and 35), as well as preferred structure and positioning of the magnets (34 and 35) and their supporting structures. FIG. 8 is a top perspective view of the invention in FIGS. 1-7 and with its cap 5 removed to reveal electrical contacts 22 and a metal socket screw 21. FIG. 8 also shows the gap 20 wherein the flared top portion of a fluid collection pan wall (not shown) could be accommodated between clamp arm 3 and clamp base 9. FIGS. 9 and 10 are respectively perspective views from the top and bottom of the invention in FIGS. 1-8 with the cap top 5, float housing 2, clamp arm 3, and clamp base 9 removed to reveal a terminal block 24 and float assembly 29. FIG. 9 shows two electrical contacts 22 and a socket screw 21 supported by terminal block 24 and used to draw upper toggle magnet 34 away from the lower float magnet 35 in the RUN state, and two springs 23 below toggle 31 (springs 23 and toggle 31 are also shown in FIG. 10). FIG. 9 further shows the assembled float assembly 29 with the non-elevating end of float frame 28 secured to the float pivot 27 on the upper surface of base plate 6. FIG. 9 also shows multiple snap-fit tabs 30 used to secure base plate 6 to the bottom end of float housing 2 and also position buoyant float material 25 supporting float magnet 35 for upward movement within the bottom end of float housing 2. FIG. 9 further shows the elevating end of float frame 28 extending away from buoyant float material 25 for use in resetting float magnet 35 from a TRIPPED state into the RUN state for additional fluid monitoring use. FIG. 10 is a perspective view from the bottom of the terminal block 24 and float assembly 29 previously seen in FIG. 9, and in FIG. 10 the terminal block 24 is shown in association with two springs 23, toggle 31, a magnet housing 32 associated with toggle 31, and a electrical contact 22 extending above terminal block 24. FIG. 10 also shows base plate 6 having multiple fluid passage openings 7 and the float foam 25 and float frame 28 of float assembly 29 supported by base plate 6. FIG. 11 is a perspective view from the side of the portion of the present invention in FIG. 10, now with its terminal block 24 removed to expose two springs 23 under a toggle bar 31, and an upper magnet 34 secured via magnet housing 32 to the top surface of one end of toggle bar 31. FIG. 11 also shows metal socket screw/pin 21 positioned for use above magnet housing 32, three electrical contacts positioned above toggle 31 and a retainer pin 33 separating and supporting fixed positioning of electrical contacts relative to toggle 31. In addition, FIG. 11 shows base plate 6 supporting float frame 28 and buoyant float material 25, with the non-elevating end of float frame 28 secured to float pivot 27. Furthermore, FIG. 11 shows tabs 30 used to provide snap-fit connection of base plate 6 to the bottom end of float housing 2 and an upper float piece used to retain magnet 35 in its intended association with buoyant float foam 25. FIG. 12 is an exploded view of the float assembly 29 shown in FIG. 11, and including upper float piece 26 that secures float magnet 35 relative to float foam 25, float frame 28 supporting float foam 25, a pillar support 36 and lower float support 37 in combination helping to support lower magnet 35 from below while associated with float foam 25, and base plate 6 that is positioned under float frame 28 during use of latching magnetic float switch 1.

Figure 13:
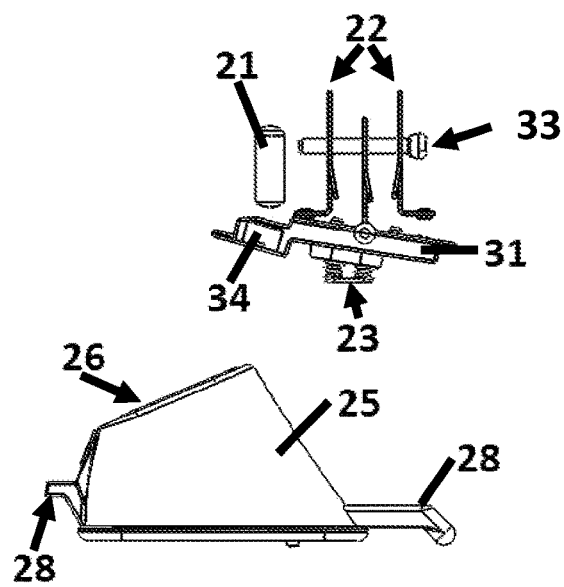
FIG. 13 is a side view of invention components shown in FIG. 11 shown in a RUN state, with toggle magnet and float magnet separated and out of alignment with one another, making their magnetic fields less attractive.
Figure 14:
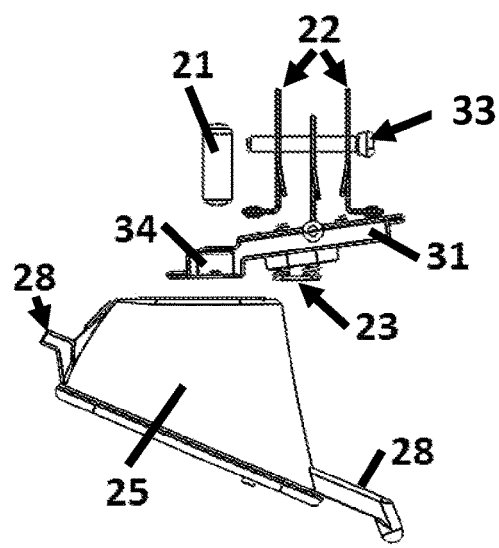
FIG. 14 is a side view of the invention components shown in FIG. 11 shown in a TRIPPED state with the toggle magnet and float magnet aligned and their magnetic fields strongly attracted to one another.
Figure 15:
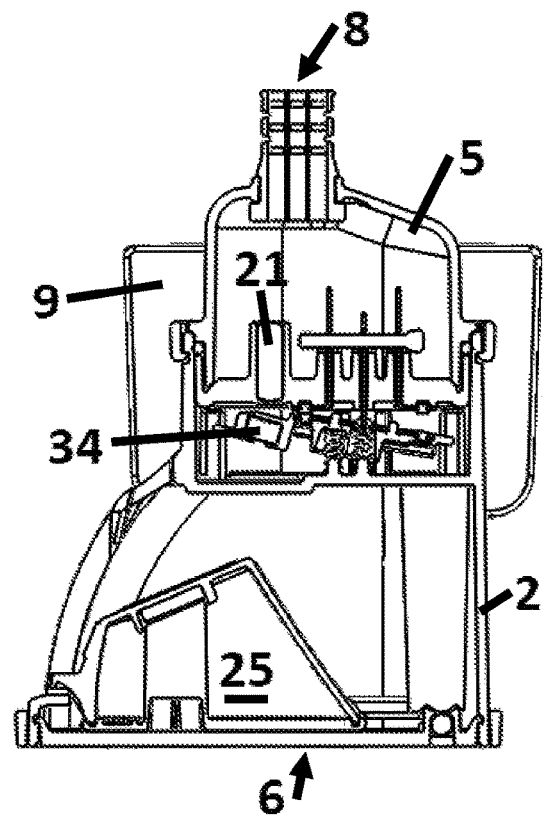
FIG. 15 is a section view of the invention components shown in FIG. 13 protected by the float housing and in a RUN state, with magnets separated.
Figure 16:
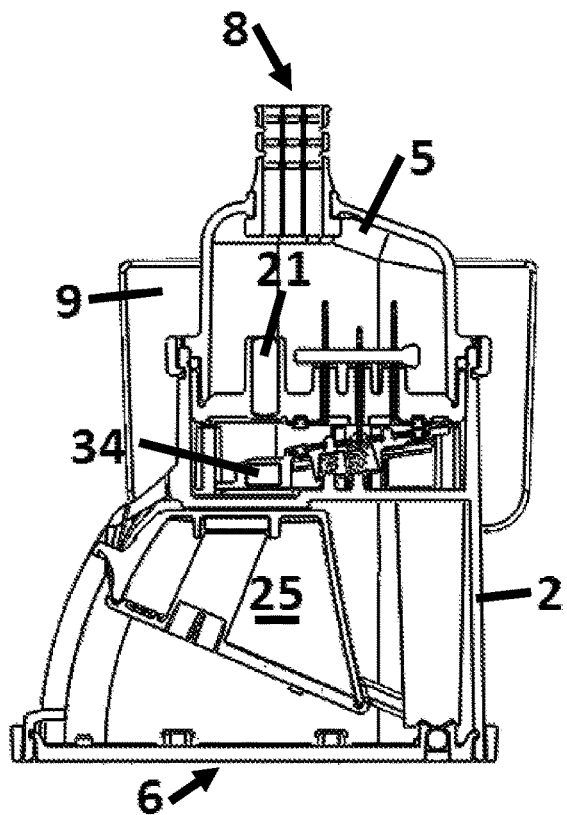
FIG. 16 is a section view of the invention components shown in FIG. 14 protected by the float housing and in a TRIPPED state (shut-off mode), with strong magnetic forces holding magnets in close association with one another.

FIGS. 13 and 14 are respectively side views of invention components shown in FIG. 11 with RUN and TRIPPED positioning, with FIGS. 15 and 16 section views respectively showing invention components in FIG. 11 within float housing 2 and having RUN and TRIPPED positioning. FIG. 13 is a side view of invention components shown in FIG. 11 and having a RUN positioning, with magnets separated. FIG. 14 is a side view of the invention components shown in FIG. 11 and having TRIPPED positioning with strong magnetic forces holding magnets 34 and 35 in close association with one another. FIG. 15 is a section view of the invention components shown in FIG. 13 protected by float housing 2 and top cap 5, and in the RUN state, with magnets separated. In contrast, FIG. 16 is a section view of the invention components shown in FIG. 14 protected by float housing 2 and in TRIPPED (system shut-off) state, with strong magnetic forces holding magnets 34 and 35 in close association with one another, and return to the RUN state requiring manual reset of the float foam 25 in the positioning shown in FIG. 15.

While the written description of the invention herein is intended to enable one of ordinary skill to make and use its best mode, it should also be appreciated that the invention disclosure only provides examples of specific embodiments and methods, and many variations, combinations, and equivalents also exist which are not specifically mentioned. The present invention should therefore not be considered as limited to the above-described embodiments, methods, and examples, but instead encompassing all embodiments and methods identified in the accompanying claims, and also within the scope and spirit of the invention.

I claim:

1. A latching magnetic float switch (1) attachable to a wall of a fluid collection pan positioned to receive a fluid from a fluid-producing system and (2) electrically communicable with said fluid-producing system to control said fluid-producing system a when said fluid from said fluid-producing system accumulates in said fluid collection pan, said latching magnetic float switch comprising:
   a float housing with a divided interior having a top end and a bottom end separate from one another, said float housing also having a trip channel through said bottom end;
   a buoyant float assembly pivotally rotatable upwardly and downwardly within said bottom end when positioned upright, said buoyant float assembly having a float magnet, said buoyant float assembly having a trip indicator with a portion thereof extending through said trip channel;
   said top end of said float housing having a wiring harness therethrough to be electrically communicable with said fluid-producing system, said top end having a toggle movable upwardly and downwardly when positioned upright within said top end between a RUN position allowing operation of said fluid-producing system and a TRIPPED position when operation of said fluid-producing system is shut off, said toggle is in association with a toggle magnet positioned lateral to said float magnet and out of alignment with said float magnet; and
   a clamp coupled to said float housing to attach said float housing to said wall of said fluid collection pan, wherein said buoyant float assembly is movable under influence of said fluid collected in said fluid collection pan to move said float magnet closer to said toggle magnet for a tripping point to be reached and said float magnet to become attracted to said toggle magnet and said float magnet is drawn up into said TRIPPED position based on said float magnet being attracted to said toggle magnet to move said toggle in a snap action that shuts off said fluid-producing system and further operation of said fluid-producing system does not occur until said buoyant float assembly is manually reset to said RUN position using said portion thereof extending through said trip channel.

2. A device comprising:
   a housing including a base and a wall, wherein the base defines an opening;
   a float extending within the housing, wherein the float is pivotally coupled to the base such that the float is pivotally moveable within the housing relative to the housing between a first position proximal to the base and a second position distal to the base, wherein the float hosts a first magnet;
   a toggle extending within the housing such that the float extends between the base and the toggle, wherein the toggle hosts a second magnet; and
   a clamp coupled to the wall, wherein the clamp is clampable onto a pan positioned to receive a liquid such that the liquid urges the float to pivotally move within the housing relative to the housing from the first position to the second position such that the first magnet is attracted to the second magnet when the liquid enters the housing through the opening towards the toggle,
   at least one of:
   (a) wherein the wall defines a channel, wherein the float includes a protrusion distal to the base, wherein the protrusion moves within the channel as the liquid urges the float to pivotally move within the housing relative to the housing from the first position to the second position such that the first magnet is attracted to the second magnet when the liquid enters the housing through the opening towards the toggle to visually indicate the liquid entering the housing through the opening;
   (b) further comprising: a spring positioned within the housing, wherein the spring engages the toggle, or
   (c) further comprising: a material positioned within the housing, wherein the material attracts the second magnet when the float is positioned in the first position, wherein the toggle extends between the base and the material.

3. The device of claim 2, wherein the wall defines the channel, wherein the float includes the protrusion distal to the base, wherein the protrusion moves within the channel as the liquid urges the float to pivotally move within the housing relative to the housing from the first position to the second position such that the first magnet is attracted to the second magnet when the liquid enters the housing through the opening towards the toggle to visually indicate the liquid entering the housing through the opening.

4. The device of claim 2, wherein the housing includes a wettable portion and a dry portion, wherein the wettable portion houses the float, wherein the dry portion houses the toggle, wherein the wettable portion includes the base.

5. The device of claim 4, further comprising:
   a wire extending from the dry portion outside the housing, wherein the wire is electrically connectable to an electrical load outside of the housing such that the electrical load enables the liquid when the float is positioned in the first position and controlled when the float is positioned in the second position as the clamp is clamping onto the pan receiving the liquid.

6. The device of claim 5, wherein the electrical load does not enable the liquid when the float is positioned in the second position as the clamp is clamping onto the pan receiving the liquid and the wire is electrically connected to the electrical load.

7. The device of claim 2, further comprising:
   the spring positioned within the housing, wherein the spring engages the toggle.

8. The device of claim 2, wherein the toggle moves within the housing relative to the housing toward the float based on the second magnet being attracted to the first magnet when the liquid urges the float to pivotally move within the housing relative to the housing from the first position to the second position such that the first magnet is attracted to the second magnet when the liquid enters the housing through the opening towards the toggle.

9. The device of claim 2, further comprising:
   a plurality of electrical contacts extending within the housing such the toggle extends between the base and the electrical contacts, wherein the electrical contacts alternately contact the toggle depending on how the toggle is positioned within the housing based on the float being positioned in the first position or the second position.

10. The device of claim 9, wherein the toggle extends between the float and the electrical contacts.

11. The device of claim 2, further comprising:
    the material positioned within the housing, wherein the material attracts the second magnet when the float is positioned in the first position, wherein the toggle extends between the base and the material.

12. The device of claim 11, wherein the toggle extends between the float and the material.

13. The device of claim 2, wherein the float includes a support and a buoyant portion, wherein the support is assembled with the buoyant portion, wherein the buoyant portion encloses the first magnet, wherein the support faces the base.

14. A method comprising:
    causing a user to access a device, wherein the device includes a housing, a float, a toggle, and a clamp, wherein the housing including a base and a wall, wherein the base defines an opening, wherein the float extending within the housing, wherein the float is pivotally coupled to the base such that the float is pivotally moveable within the housing relative to the housing between a first position proximal to the base and a second position distal to the base, wherein the float hosts a first magnet, wherein the toggle extending within the housing such that the float extends between the base and the toggle, wherein the toggle hosts a second magnet, wherein the clamp coupled to the wall; and causing the user to operate the device such that the clamp clamps onto a pan positioned to receive a liquid such that the liquid urges the float to pivotally move within the housing relative to the housing from the first position to the second position such that the first magnet is attracted to the second magnet as the liquid enters the housing through the opening towards the toggle, at least one of:
    (a) wherein the wall defines a channel, wherein the float includes a protrusion distal to the base, wherein the protrusion moves within the channel as the liquid urges the float to pivotally move within the housing relative to the housing from the first position to the second position such that the first magnet is attracted to the second magnet as the liquid enters the housing through the opening towards the toggle to visually indicate the liquid entering the housing through the opening, (b) wherein the device includes a spring positioned within the housing, wherein the spring engages the toggle, or (c) wherein the device includes a material positioned within the housing, wherein the material attracts the second magnet as the float is positioned in the first position, wherein the toggle extends between the base and the material.

15. The method of claim 14, wherein the wall defines the channel, wherein the float includes the protrusion distal to the base, wherein the protrusion moves within the channel as the liquid urges the float to pivotally move within the housing relative to the housing from the first position to the second position such that the first magnet is attracted to the second magnet as the liquid enters the housing through the opening towards the toggle to visually indicate the liquid entering the housing through the opening.

16. The method of claim 14, wherein the housing a wettable portion and a dry portion, wherein the wettable portion houses the float, wherein the dry portion houses the toggle, wherein the wettable portion includes the base.

17. The method of claim 16, wherein the device includes a wire extending from the dry portion outside the housing, and further comprising:
    causing the user to operate the device such that the wire is electrically connected to an electrical load outside of the housing and the electrical load enables the liquid as the float is positioned in the first position and controlled as the float is positioned in the second position as the clamp is clamping onto the pan receiving the liquid.

18. The method of claim 17, wherein the electrical load does not enable the liquid as the float is positioned in the second position as the clamp is clamping onto the pan receiving the liquid and the wire is electrically connected to the electrical load.

19. The method of claim 14, wherein the device includes the spring positioned within the housing, wherein the spring engages the toggle.

20. The method of claim 14, wherein the toggle moves within the housing relative to the housing toward the float based on the second magnet being attracted to the first magnet as the liquid urges the float to pivotally move within the housing relative to the housing from the first position to the second position such that the first magnet is attracted to the second magnet as the liquid enters the housing through the opening towards the toggle.

21. The method of claim 14, wherein the device includes a plurality of electrical contacts extending within the housing such the toggle extends between the base and the electrical contacts, wherein the electrical contacts alternately contact the toggle depending on how the toggle is positioned within the housing based on the float being positioned in the first position or the second position.

22. The method of claim 21, wherein the toggle extends between the float and the electrical contacts.

23. The method of claim 14, wherein the device includes the material positioned within the housing, wherein the material attracts the second magnet as the float is positioned in the first position, wherein the toggle extends between the base and the material.

24. The method of claim 23, wherein the toggle extends between the float and the material.

25. The method of claim 14, wherein the float includes a support and a buoyant portion, wherein the support is assembled with the buoyant portion, wherein the buoyant portion encloses the first magnet, wherein the support faces the base.

26. A device comprising:
a housing;
a float moveable relative to the housing between a first position and a second position, wherein the float hosts a first magnet;
a toggle extending within the housing, wherein the toggle hosts a second magnet;
and a clamp coupled to the housing, wherein the clamp clamps onto a pan positioned to receive a liquid such that the liquid urges the float to move relative to the housing from the first position to the second position and the first magnet is attracted to the second magnet when the liquid contacts the float within the pan,
at least one of:
(a) wherein the housing including a base and a wall, wherein the base defines an opening, wherein the wall defines a channel, wherein the float includes a protrusion distal to the base, wherein the protrusion moves within the channel as the liquid urges the float to pivotally move within the housing relative to the housing from the first position to the second position such that the first magnet is attracted to the second magnet when the liquid enters the housing through the opening towards the toggle to visually indicate the liquid entering the housing through the opening;
(b) further comprising: a spring positioned within the housing, wherein the spring engages the toggle, or
(c) further comprising: a material positioned within the housing, wherein the material attracts the second magnet when the float is positioned in the first position, wherein the toggle extends between the base and the material.

\* \* \* \* \*